United States Patent
Yang et al.

(10) Patent No.: US 9,142,952 B2
(45) Date of Patent: Sep. 22, 2015

(54) MULTI-FUNCTION TERMINAL OF POWER SUPPLY CONTROLLER FOR FEEDBACK SIGNAL INPUT AND OVER-TEMPERATURE PROTECTION

(75) Inventors: Ta-Yung Yang, Milpitas, CA (US); Chao-Chih Lin, Taoyuan County (TW)

(73) Assignee: SYSTEM GENERAL CORPORATION, Taipei Hsien (TW)

( * ) Notice: Subject to any disclaimer, the term of this patent is extended or adjusted under 35 U.S.C. 154(b) by 986 days.

(21) Appl. No.: 13/293,296

(22) Filed: Nov. 10, 2011

(65) Prior Publication Data

US 2012/0206117 A1  Aug. 16, 2012

Related U.S. Application Data

(60) Provisional application No. 61/442,982, filed on Feb. 15, 2011.

(51) Int. Cl.
| | |
|---|---|
| G05F 1/00 | (2006.01) |
| H02H 5/04 | (2006.01) |
| H02M 3/156 | (2006.01) |
| H02M 1/32 | (2007.01) |
| H02M 3/158 | (2006.01) |

(52) U.S. Cl.
CPC ............ *H02H 5/042* (2013.01); *G05F 1/00* (2013.01); *H02M 3/156* (2013.01); *H02M 3/158* (2013.01); *H02M 2001/327* (2013.01)

(58) Field of Classification Search
None
See application file for complete search history.

(56) References Cited

U.S. PATENT DOCUMENTS

| | | | | |
|---|---|---|---|---|
| 5,021,620 A | * | 6/1991 | Inumada | 219/716 |
| 5,291,387 A | * | 3/1994 | Ohshima | 363/56.11 |
| 5,543,996 A | * | 8/1996 | Nakago | 361/90 |
| 7,545,609 B2 | * | 6/2009 | Suzuki | 361/18 |
| 2012/0113551 A1 | * | 5/2012 | Huang | 361/18 |

\* cited by examiner

*Primary Examiner* — Jared Fureman
*Assistant Examiner* — Terrence Willoughby
(74) *Attorney, Agent, or Firm* — Bacon & Thomas, PLLC

(57) ABSTRACT

The present invention provides a control circuit having a multi-function terminal. The control circuit comprises a switching circuit, a sample-and-hold circuit, a detection circuit, and a comparator. The sample-and-hold circuit is coupled to the multi-function terminal for generating a sample voltage by sampling the feedback signal during a first period. The detection circuit is coupled to the multi-function terminal during a second period for generating a detection voltage. The comparator compares the detection voltage and the sample voltage for generating an over-temperature signal, wherein the over-temperature signal is couple to disable the switching signal.

17 Claims, 3 Drawing Sheets

FIG. 2

MULTI-FUNCTION TERMINAL OF POWER SUPPLY CONTROLLER FOR FEEDBACK SIGNAL INPUT AND OVER-TEMPERATURE PROTECTION

BACKGROUND OF THE INVENTION

1. Field of Invention

The present invention relates to a power converter, and more particularly, the present invention relates to a control circuit having a multi-function terminal of power converter.

2. Description of Related Art

FIG. 1 shows prior art of a power converter. The power converter comprises a boost converter 30, a controller (CNTR) 50, a thermal device 40 and a voltage divider developed by resistors 41 and 42. The boost converter 30 includes an inductor 10, a transistor 15, a rectifier 20 and a capacitor 25. One terminal of the inductor 10 receives an input voltage $V_{IN}$. The other terminal of the inductor 10 is connected to an anode of the rectifier 20 and a drain of the transistor 15. A source of the transistor 15 is connected to a ground. A gate of transistor 15 is coupled to a switching terminal SW (not shown) of the controller 50 and controlled by a switching signal $S_W$. A cathode of the rectifier 20 is connected to one terminal of the capacitor 25. The other terminal of the capacitor 25 is connected to the ground. An output voltage $V_O$ is generated across the capacitor 25 and is the same as an output of the boost converter 30. The output of the boost converter 30 is also an output of the power converter.

The controller 50 generates the switching signal $S_W$ to switch the transistor 15 for producing the output voltage $V_O$ of the power converter. A feedback signal $V_{FB}$ is generated at a joint of the resistors 41 and 42 of the voltage divider in response to the output voltage $V_O$. The feedback signal $V_{FB}$ is applied to a feedback terminal FB (not shown) of the controller 50 for generating the switching signal $S_W$ and regulating the output voltage $V_O$. An over-temperature signal $S_{OT}$ is generated from the thermal device 40 coupled to the controller 50 for over-temperature protection. That is to say, the controller 50 performs over-temperature protection in accordance with the over-temperature signal $S_{OT}$ generated by the thermal device 40.

SUMMARY OF THE INVENTION

An object of the present invention is to provide a multi-function terminal for a switching power supply controller. This terminal is utilized to receive a feedback signal and connect to a thermal device for over-temperature protection.

To achieve the aforementioned object, the present invention provides a control circuit having the multi-function terminal, comprising: a switching circuit, the switching circuit generating a switching signal in response to a feedback signal; a sample-and-hold circuit, the sample-and-hold circuit coupled to the multi-function terminal for generating a sample voltage by sampling the feedback signal during a first period; a detection circuit, the detection circuit coupled to the multi-function terminal during a second period for generating a detection voltage; and a comparator, the comparator comparing the detection voltage and the sample voltage for generating an over-temperature signal, wherein the over-temperature is couple to disable the switching signal.

The aforementioned first period is disabled when the second period is enabled.

To achieve the aforementioned object, the present invention further provides a control circuit having a multi-function terminal, comprising: a switching circuit, generating a switching signal; a plurality of function circuits, coupled to the multi-function terminal and generating a plurality of function signals based on a signal on the multi-function terminal; and a comparator, comparing the function signals for generating an output signal to disable the switching circuit generating the switching signal.

The rest of the aforementioned function circuits are disabled when one of the aforementioned function circuits is enabled.

DESCRIPTION OF THE PREFERRED EMBODIMENTS

Figure 1:
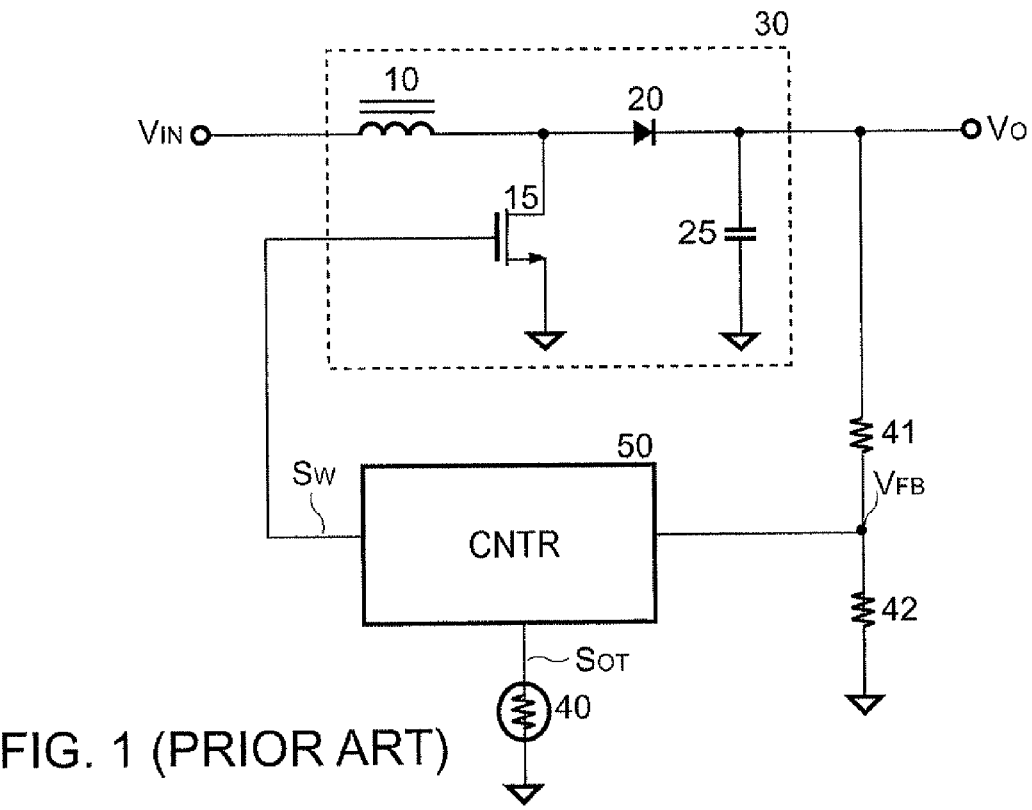
FIG. 1 shows prior art of a power converter.
Figure 2:
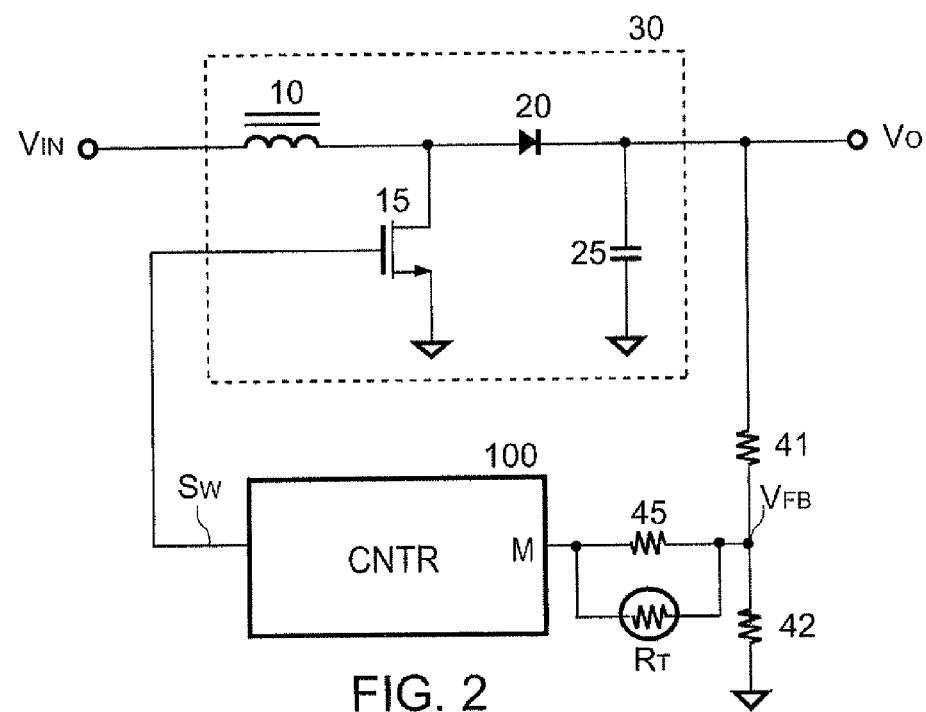
FIG. 2 shows a schematic diagram of a preferred embodiment of a power converter in accordance with the present invention.

FIG. 2 shows a schematic diagram of a preferred embodiment of a power converter in accordance with the present invention. The power converter comprises a boost converter 30, a control circuit (CNTR) 100, a thermal device $R_T$ and a voltage divider formed by resistors 41 and 42. Comparing with the FIG. 1, the control circuit 100 is provided with a multi-function terminal M in this preferred embodiment. The power converter further comprises a resistor 45 coupled to the thermal device $R_T$ in parallel in accordance with the present invention. The resistor 45 is coupled between the multi-function terminal M of the control circuit 100 and a joint of the resistors 41 and 42. The multi-function terminal M is utilized to receive a feedback signal $V_{FB}$ and connect to the thermal device $R_T$ for over-temperature protection. The feedback signal $V_{FB}$ is correlated to an output voltage $V_O$ of the power converter. The resistor 45 is connected to the thermal device $R_T$ in parallel for adjusting the over-temperature protection. The thermal device $R_T$ has a negative temperature coefficient. In other words, the resistance of the thermal device $R_T$ is increased once the temperature decreases. The resistance of the thermal device $R_T$ is decreased once the temperature increases.

Figure 3:
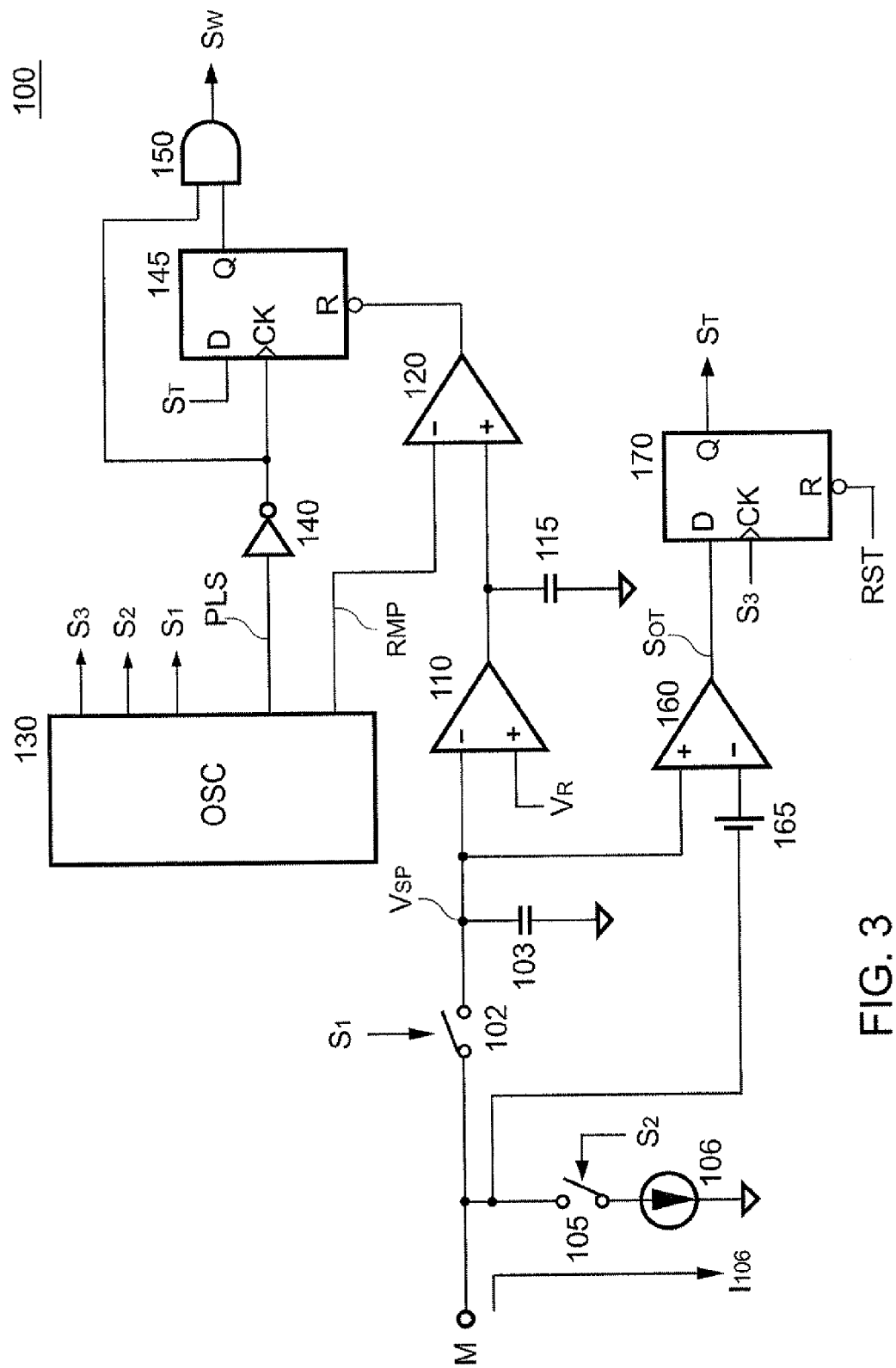
FIG. 3 is a preferred embodiment of a control circuit in accordance with the present invention.

FIG. 3 is a preferred embodiment of the control circuit 100 in accordance with the present invention. The control circuit 100 comprises a comparator 160, a switching circuit, and a plurality of function circuits comprising a sample-and-hold circuit and a detection circuit. The sample-and-hold circuit is developed by a switch 102 and a capacitor 103. The feedback signal $V_{FB}$ is applied to the multi-function terminal M of the control circuit 100. One terminal of the switch 102 is coupled to the multi-function terminal M for receiving the feedback signal $V_{FB}$. The other terminal of the switch 102 is coupled to one terminal of the capacitor 103. The other terminal of the capacitor 103 is coupled to the ground. The switch 102 is used for sampling the feedback signal $V_{FB}$ and a control terminal of the switch 102 is controlled by a first timing signal $S_1$. The capacitor 103 is used for holding the feedback signal $V_{FB}$. A sample voltage (first function signal) $V_{SP}$ is generated across the capacitor 103 in response to the feedback signal $V_{FB}$ during a first period. The first period is generated by an on-time period of the first timing signal $S_1$. The sample voltage $V_{SP}$ is correlated to the feedback signal $V_{FB}$. The feedback signal $V_{FB}$ is correlated to the output voltage $V_O$ of the power converter.

The switching circuit is formed by an error amplifier 110, a capacitor 115, an oscillation circuit (OSC) 130, a comparator 120, an inverter 140, a flip-flop 145 and an AND gate 150. The oscillation circuit 130 generates a pulse signal PLS, a ramp signal RMP, the first timing signal $S_1$, a second timing signal $S_2$ and a third timing signal $S_3$. The sample voltage $V_{SP}$ generated across the capacitor 103 is coupled to a negative input of the error amplifier 110 when the switch 102 controlled by the first timing-signal $S_1$ is turned on. A positive input of the error amplifier 110 has a reference signal $V_R$ for the output regulation. An output of the error amplifier 110 is coupled to one terminal of the capacitor 115 for the frequency compensation. The Other terminal of the capacitor 115 is coupled to the ground. The output of the error amplifier 110 is further coupled to a positive input of the comparator 120.

The ramp signal RMP is supplied to a negative input of the comparator 120. Comparing the ramp signal RMP with a signal at the output of the error amplifier 110, a reset signal is generated at an output of the comparator 120 to reset the flip-flop 145. A reset input R of the flip-flop 145 receives the reset signal once the ramp signal RMP is larger than the signal at the output of the error amplifier 110. An input of the inverter 140 receives the pulse signal PLS. An output of the inverter 140 is coupled to a clock input CK of the flip-flop 145. That is to say, the oscillation circuit 130 generates the pulse signal PLS to turn on the flip-flop 145 via the inverter 140. The output of the inverter 140 and an output of the flip-flop 145 are connected to the AND gate 150 respectively for generating a switching signal $S_W$ with a switching cycle. The pulse signal PLS provides a limitation to a maximum on-time period of the switching signal $S_W$.

The detection circuit is developed by a switch 105 and a current source 106. One terminal of the switch 105 is coupled to the multi-function terminal M. The other terminal of the switch 105 is coupled to one terminal of the current source 106. The other terminal of the current source 106 is coupled to the ground. In other words, the current source 106 is coupled to the multi-function terminal M via the switch 105. A detection voltage (second function signal) $V_M$ will be generated at the multi-function terminal M when the switch 105 controlled by the second timing-signal $S_2$ is turned on and a current $I_{106}$ determined by the current source 106 is flowed into the multi-function terminal M. That is to say, the current source 106 is associated with the thermal device $R_T$ to generate the detection voltage $V_M$. The detection voltage $V_M$ is generated during a second period generated by an on-time period of the second timing signal $S_2$.

The one terminal of the capacitor 103 is further coupled to a positive input of the comparator 160. The sample voltage $V_{SP}$ generated across the capacitor 103 is applied to the positive input of the comparator 160 during the first period generated by an on-time period of the first timing signal $S_1$. A negative input of the comparator 160 is coupled to the multi-function terminal M through an over-temperature threshold 165. An over-temperature signal $S_{OT}$ generated at an output of the comparator 160. The over-temperature signal $S_{OT}$ will be latched into the flip-flop 145. The comparator 160 compares the detection voltage $V_M$ with the sample voltage $V_{SP}$ for generating the over-temperature signal $S_{OT}$. The over-temperature signal $S_{OT}$ is used to disable the switching signal $S_W$. In addition, the control circuit 100 further comprises the over-temperature threshold 165 for generating the over-temperature signal $S_{OT}$.

The oscillation circuit 130 generates the timing signals $S_1$, $S_2$ and $S_3$ once the switching signal $S_W$ is disabled. When the first timing signal $S_1$ is enabled and the second timing signal $S_2$ is disabled, the feedback signal $V_{a1}$ is sampled into the capacitor 103. In the meantime, the switch 102 is turned on and the switch 105 is turned off. The sample-and-hold circuit developed by the switch 102 and the capacitor 103 generates the sample voltage $V_{SP}$ by sampling the feedback signal $V_{FB}$ during the first period. When the second timing signal $S_2$ is enabled, the first timing-signal $S_1$ is disabled, the current $I_{106}$ determined by the current source 106 is flowed into the multi-function terminal M. The detection voltage $V_M$ will be applied to the negative input of the comparator 160 via the over-temperature threshold 165. In the meantime, the switch 102 is turned off and the switch 105 is turned on. Therefore, the comparator 160 is utilized to generate the over-temperature signal $S_{OT}$ by comparing the detection voltage $V_M$ with the sample voltage $V_{SP}$. The over-temperature signal $S_{OT}$ is enabled once the value of the sample voltage $V_{SP}$ is lower than the value of the detection voltage $V_M$.

The feedback signal $V_{FB}$ is divided by the output voltage $V_O$ through the voltage divider. The feedback signal $V_{FB}$ can be written by the following, $$V_{FB} = \frac{R_{42}}{R_{41} + R_{42}} \times V_o \tag{1}$$

The equivalent resistance $R_D$ is determined by the resistors 41 and 42.

$$R_D = \frac{R_{41} \times R_{42}}{R_{41} + R_{42}} \tag{2}$$

The equivalent resistance $R_{PT}$ is determined by the resistor 45 and the thermal device $R_T$.

$$R_{PT} = \frac{R_T \times R_{45}}{R_T + R_{45}} \tag{3}$$

The equivalent resistance $R_{EQ}$ is generated by the equivalent resistance $R_D$ plus the equivalent resistance $R_{PT}$ as below, $$R_{EQ} = R_D + R_{PT} \tag{4}$$

The equivalent voltage $V_{DP}$ is generated by the current $I_{106}$ and the equivalent resistance $R_{EQ}$ as below, $$V_{DP} = I_{106} \times R_{EQ} \tag{5}$$

The detection voltage $V_M$ is generated by the feedback signal $V_{FB}$ minus the equivalent voltage $V_{DP}$ as below, $$V_M = V_{FB} - V_{DP} \tag{6}$$

The detection voltage $V_M$ will be generated at the multi-function terminal when the current $I_{106}$ is flowed into the multi-function terminal M.

The control circuit 100 further comprises a flip-flop 170. An input D of the flip-flop 170 is coupled to the output of the comparator 160 for receiving the over-temperature signal $S_{OT}$. A clock input CK of the flip-flop 170 receives the third timing signal $S_3$ to trigger the flip-flop 170. A reset input R of the flip-flop 170 is rested by a signal RST. An output Q of the flip-flop 170 is connected to an input D of the flip-flop 145 for controlling the switching signal $S_W$ in accordance with the over-temperature signal $S_{OT}$.

When the temperature on the power converter is at a low level, the resistance of the thermal device $R_T$ is increased because the thermal device $R_T$ has a negative temperature coefficient as mentioned previously. The equivalent resistances $R_{PT}$ and $R_{EQ}$ are increased accordingly. The equivalent voltage $V_{DP}$ is thus increased and the detection voltage $V_M$ will be decreased. Since the equivalent voltage $V_{DP}$ is higher than the over-temperature threshold 165, the over-temperature signal $S_{OT}$ generated by the output of the comparator 160 will be logic-high level. The signal $S_T$ is a logic-high level once the over-temperature signal $S_{OT}$ is a logic-high level and the third timing signal $S_3$ is enabled. The flip-flop 145 is thus enabled for generating the switching signal $S_W$.

On the other hand, the resistance of the thermal device $R_T$ is decreased when the temperature on the power converter is at a high level. The equivalent resistances $R_{PT}$ and $R_{EQ}$ are decreased accordingly. The equivalent voltage $V_{DP}$ is thus decreased and the detection voltage $V_M$ will be increased. Since the equivalent voltage $V_{DP}$ is lower than the over-temperature threshold 165, the over-temperature signal $S_{OT}$ generated by the output of the comparator 160 will be a logic-low level. The signal $S_T$ is a logic-low level once the over-temperature signal $S_{OT}$ is a logic-low level and the flip-flop 170 is disabled. The flip-flop 145 and the switching signal $S_W$ are thus disabled for over-temperature protection.

Figure 4:
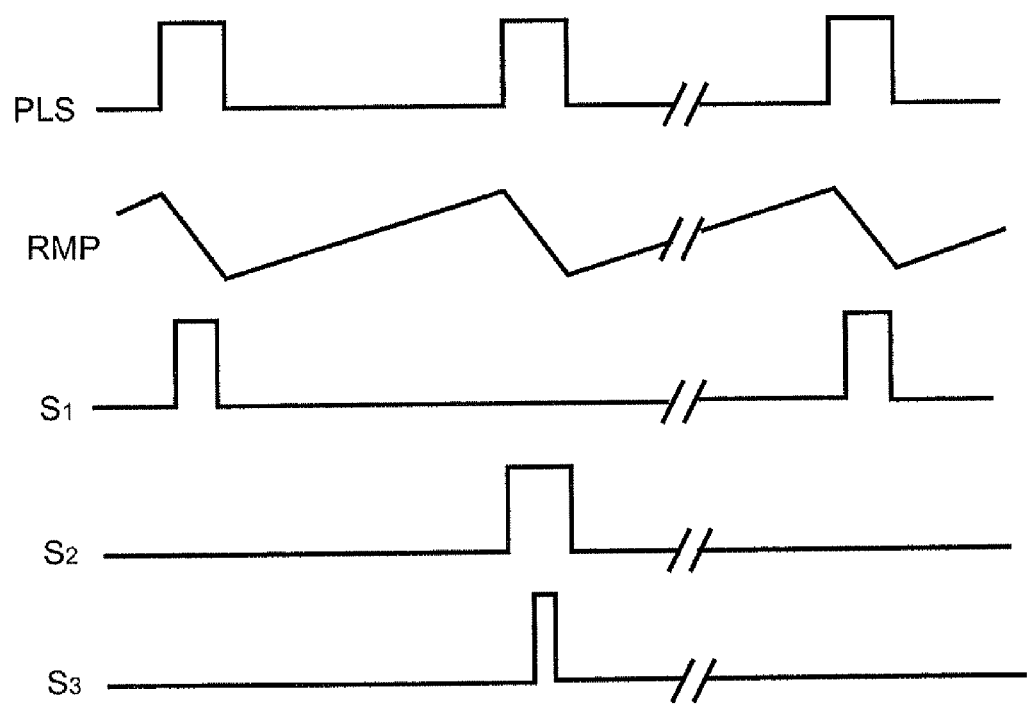
FIG. 4 shows the waveforms of a pulse signal PLS, a ramp signal RMP and timing signals $S_1$-$S_3$ in accordance with the present invention.

FIG. 4 shows the waveforms of the pulse signal PLS, the ramp signal RMP and the timing signals $S_1$-$S_3$ in accordance with the present invention. The ramp signal RMP is decreased when the pulse signal PLS is enabled, and the ramp signal RMP is increased once the pulse signal PLS is disabled. During the first period, generated by the on-time period of the first timing signal $S_1$, the first timing signal $S_1$ is enabled to turn on the switch 102 for sampling the feedback signal $V_{FB}$ into the capacitor 103. The sample voltage $V_{SP}$ is generated across the capacitor 103. Thus, the switching circuit generates the switching signal $S_W$ for the output regulation in response to the feedback signal $V_{FB}$. In addition, when the first timing signal $S_1$ is enabled, the timing signals $S_2$ and $S_3$ are disabled. During the second period, generated by an on-time period of the second timing signal $S_2$, the second timing signal $S_2$ is enabled to turn on the switch 105 and then the current source 106 is coupled to the multi-function terminal M for generating the detection voltage $V_M$. When the second timing signal $S_2$ is enabled and the switch 105 is turned on, the current $I_{106}$ determined by the current source 106 flows into the multi-function terminal M. In addition, when the second timing signal $S_2$ is enable, the first timing signal $S_1$ is disable. As mentioned previously, the on-time period of the third timing signal $S_3$ is smaller than the on-time period of the second timing signal $S_2$. The signal $S_T$ generated by the flip-flop 170 will be a logic-low level when the third timing signal $S_3$ is enabled and the over-temperature signal $S_{OT}$ generated by the output of the comparator 160 is a logic-low level. When the signal $S_T$ is a logic-low level and the flip-flop 145 is disabled, the switching signal $S_W$ is thus disabled for over-temperature protection.

Based on the present invention, an additional terminal is not required to be added the control circuit 100. Therefore, the terminals of the control circuit 100 can be reduced and cost for production will also be reduced.

What is claimed is:
1. A control circuit having a multi-function terminal, comprising:
   a switching circuit, the switching circuit generating a switching signal in response to a feedback signal;
   a sample-and-hold circuit, the sample-and-hold circuit coupled to the multi-function terminal for generating a sample voltage by sampling the feedback signal during a first period;
   a detection circuit, the detection circuit coupled to the multi-function terminal during a second period for generating a detection voltage; and
   a comparator, the comparator comparing the detection voltage and the sample voltage for generating an over-temperature signal,
   wherein the over-temperature is couple to disable the switching signal.
2. The control circuit as claimed in claim 1, wherein the first period is disabled when the second period is enabled.
3. The control circuit as claimed in claim 1, wherein the first period generated by a first timing signal and the second period generated by a second timing signal are used to enable the sample-and-hold circuit and the detection circuit respectively.
4. The control circuit as claimed in claim 1, wherein the detection circuit couples to a thermal device through the multi-function terminal for generating the detection voltage.
5. The control circuit as claimed in claim 1, further comprising an over-temperature threshold for generating the over-temperature signal.
6. The control circuit as claimed in claim 1, wherein the detection circuit comprises a current source.
7. The control circuit as claimed in claim 6, wherein the current source couples to the thermal device.
8. The control circuit as claimed in claim 6, wherein the detection circuit further comprises a switch.
9. The control circuit as claimed in claim 1, wherein the feedback signal is correlated to an output of a power converter.
10. The control circuit as claimed in claim 1, wherein the switching signal is generated in response to the feedback signal for regulating an output of the power converter.
11. The control circuit as claimed in claim 1, wherein the control circuit further comprises a flip-flop for controlling the switching signal during a second period.
12. A control circuit having a multi-function terminal, comprising:
    a switching circuit, generating a switching signal;
    a plurality of function circuits, coupled to the multi-function terminal and generating a plurality of function signals based on a signal on the multi-function terminal; and
    a comparator, comparing the function signals for generating an output signal to disable the switching circuit generating the switching signal;
    wherein one of the plurality of function signal is a sample voltage generated by sampling a feedback signal on the multi-function terminal.
13. The control circuit as claimed in claim 12, wherein the rest of the function circuits are disabled when one of the function circuits is enabled.
14. The control circuit as claimed in claim 12, wherein the plurality of function circuits comprises a sample-and-hold circuit, the sample-and-hold circuit is coupled to the multi-function terminal and generates the sample voltage by sampling a feedback signal on the multi-function terminal during a first period generated by the switching circuit.
15. The control circuit as claimed in claim 12, wherein the plurality of function circuits comprises a detection circuit, the detection circuit is coupled to the multi-function terminal and generates a detection voltage during a second period generated by the switching circuit.

16. The control circuit as claimed in claim 12, wherein the plurality of function circuits comprises:
- a sample-and-hold circuit, the sample-and-hold circuit is coupled to the multi-function terminal and generates a sample voltage by sampling a feedback signal on the multi-function terminal during a first period generated by the switching circuit; and
- a detection circuit, the detection circuit is coupled to the multi-function terminal and generates a detection voltage during a second period generated by the switching circuit;
- wherein the first period and the second period are used to enable the function circuits respectively.

17. The control circuit as claimed in claim 12, wherein the output signal is an over-temperature signal, and the multi-function terminal couples to a thermal resistor.

\* \* \* \* \*